(12) United States Patent
Gheith et al.

(10) Patent No.: US 8,688,432 B2
(45) Date of Patent: Apr. 1, 2014

(54) METHOD, APPARATUS AND FULL-SYSTEM SIMULATOR FOR SPEEDING MMU SIMULATION

(75) Inventors: Ahmed Gheith, Austin, TX (US); Hua Yong Wang, Beijing (CN); Kun Wang, Beijing (CN); Yu Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 987 days.

(21) Appl. No.: 12/259,891

(22) Filed: Oct. 28, 2008

(65) Prior Publication Data

US 2009/0119089 A1 May 7, 2009

(30) Foreign Application Priority Data

Oct. 31, 2007 (CN) .......................... 2007 1 0167039

(51) Int. Cl.
*G06F 9/455* (2006.01)
(52) U.S. Cl.
USPC .......................................................... 703/23
(58) Field of Classification Search
USPC ................ 703/23, 18; 711/6, 207, 153; 718/1
See application file for complete search history.

(56) References Cited

U.S. PATENT DOCUMENTS

| | | | | |
|---|---|---|---|---|
| 5,574,873 A | * | 11/1996 | Davidian | 712/200 |
| 7,035,963 B2 | | 4/2006 | Neiger | |
| 7,089,377 B1 | * | 8/2006 | Chen | 711/147 |
| 7,275,246 B1 | | 9/2007 | Yates | |
| 7,281,102 B1 | | 10/2007 | Agesen | |
| 7,881,921 B1 | * | 2/2011 | Dobbelaere | 703/22 |
| 2002/0046305 A1 | | 4/2002 | Babaian | |

OTHER PUBLICATIONS

Rosenblum et al., Complete Computer System Simulation: The SimOS Approach, 1995, IEEE, pp. 34-43.*
Eiraku, et al, "Running BSD Kernels as User Processes by Partial Emulation and Rewriting of Machine Instructions", BSDCon 2003, Usenix.org.

* cited by examiner

*Primary Examiner* — Omar Fernandez Rivas
*Assistant Examiner* — Bernard E Cothran
(74) *Attorney, Agent, or Firm* — William Stock; Anne Vachon Dougherty

(57) ABSTRACT

A method, apparatus, and full-system simulator for speeding memory management unit simulation with direct address mapping on a host system, the host system supporting a full-system simulator, on which a guest system is simulated, the method comprising the following steps: setting a border in the logical space assigned for the full-system simulator by the host system, thereby dividing the logical space into a safe region and a simulator occupying region; shifting the full-system simulator itself from the occupied original host logical space to the simulator occupying region; and reserving the safe region for use with at least part of the guest system.

20 Claims, 11 Drawing Sheets

METHOD, APPARATUS AND FULL-SYSTEM SIMULATOR FOR SPEEDING MMU SIMULATION

TECHNICAL FIELD

The invention generally relates to the field of computer system simulation, and particularly relates to a method, apparatus, and full-system simulator for speeding memory management unit (MMU) simulation with direct address mapping on the host system.

BACKGROUND OF THE INVENTION

Almost all computer architectures can be evaluated and researched with simulators. A simulator allows the designer to quickly evaluate the performances of various architectures, reducing the cost and saving the project development time.

For example, the simulator technologies and categories are briefly introduced in Joshua J. Yi, David J. Liljia, "Simulation of Computer Architectures: Simulators, Benchmarks, Methodologies, and Recommendations" (IEEE Transactions on Computers, March, 2006, Vol. 55, Issue 3, pp. 268-280).

A simulator simulates all components of a real computer by employing software programs on a computer. Typical computer architecture is comprised of one or more central processing unit (CPU), memory, periphery device, and bus, wherein a CPU is the core of a computer and is used for performing computing tasks, the memory and various periphery devices are attached to the bus.

A full-system simulator is a program that provides virtualized execution environment for operating systems (OS) and applications. For example, a full-system simulator can enable PowerPC Linux and related Linux applications to run on an x86 Windows platform. Binary translation (BT) technology is a current technology for speeding a full-system simulator. Binary translation may be static or dynamic (in related to execution time). In static binary translation (SBT), the translation process is performed prior to the execution of programs or even prior to the execution of the simulator. All source binary codes are translated only once. After the stage of the translation process, translation will not be performed any more, and the resulting binary codes may be executed any times when needed. In dynamic binary translation (DBT), the translation is performed only when codes are needed and executed. When the codes are translated at the first time, they are stored in a cache, and reused whenever the same codes are executed. Since the translation is performed at runtime, the code translation time must be added into the time spent for code simulation. Therefore, the translation must be performed as quickly as possible. This also means that the benefit of the execution of the translated codes must significantly override the time spent for code translation.

The typical examples of full-system simulators implemented by employing dynamic translation technology comprise: a simulator disclosed in Richard Uhlig, Roman Fishtein, Oren Gershon, Israel Hirsh, and Hong Wang, "SoftSDV: A Presilicon Software Development Environment for the IA-64 Architecture" (Intel Technology Journal Q4, 1999); and QEMU (please refer to the qemu page at the fabrice.bellanrd.free.fr web site). Moreover, the typical full-system simulators also comprise: Simics system (please refer to virtutech.com), Skyeye system (please refer to the web page skyeye.org), and Wukong system (please refer to the wukong page at embedded.zju.edu.cn).

In this specification, the full-system simulators that employ DBT technology will be described, which are referred to as full-system simulators for the purpose of simplicity.

Most modern computers contain a memory management unit (MMU) that translates logical addresses (LAs) used by software into physical addresses (PAs) used to access memory and I/O devices. MMU creates, for operating system and all applications, a virtual address space, which freely maps physical memory pages to virtual address memory pages. MMU sets different properties and protections for each virtual page. MMU simulation therefore is an important part in full-system simulation. However, since MMU is a sort of complicated hardware with complex behaviors, it is difficult to simulate such behaviors. Thus, the known solutions to implement MMU simulation introduce a large performance overhead.

For example, a full-system simulator using MMU simulation is disclosed in Emmett Witchel and Mendel Rosenblum, "Embra: fast and flexible machine simulation" (Proceedings of the 1996 ACM SIGMETRICS International Conference on Measurement and Modeling of Computer Systems, Philadelphia, Pa., USA, 1996, pp 68-79). In the disclosure, the following report result is provided: when both the guest machine and the host machine are MIPS (Microprocessor without Interlocked Piped Stages) machines, the whole system's slowdown is a factor of 3 or 4, if MMU is simulated. Meanwhile, in the experiment by the applicants, MMU simulation itself introduces a slowdown factor of about 1.7 in a typical instruction distribution pattern when simulating a PowerPC ISA (Instruction Set Architecture) on an x86 host machine. Here, the typical instruction distribution pattern means that on average ⅓ of all dynamic instructions are load/store instructions, and ⅕ of all dynamic instructions are branches.

FIG. 1 illustrates the logical structure of a traditional MMU simulation. As shown in FIG. 1, an exemplary code fragment before translation is shown on the left side of FIG. 1, a code fragment obtained after the translation of the exemplary code fragment is shown in the middle of FIG. 1, and the contents stored in a Translation Lookaside Buffer (TLB) is shown on the right side of FIG. 1.

MMU completes the task of address translation with the help of TLB. Every TLB entry in a TLB table contains an address of a 4 k virtual memory pages (i.e. virtual address) and the corresponding physical memory address of the page, along with some bits for the purpose of authority and protection (these bits are not shown in FIG. 1 for simplicity). It is noted that a TLB table is a large array in a simulator, thus may be directly accessed, and the TLB table mentioned herein is the TLB table simulated inside the simulator instead of the TLB table of real hardware.

Address translation, whose process is complicated, is needed for each load/store instruction in the code fragment. In general, in code binary translation, it is needed to translate a load/store instruction in the guest machine into multiple instructions in the host machine in order to complete the corresponding function. A load/store instruction is usually translated into a call to a function, in which the complicated function is completed. That is to say, a load/store instruction in the guest machine is translated into a function in the host machine. Wherein, the functions corresponding to the load and store instruction are predetermined. For different simulator products of different corporations, the corresponding functions may be different, while the corresponding functions are fixed in the same simulator. Thus, in the translation process, it is only required that each load instruction in the guest machine is translated into a call to a corresponding function in the host machine, and each store instruction in the guest machine is translated into a call to another corresponding function in the host machine. Since the executions of load/store instruction both need address translation and access, their particular functions are not differentiated hereinbelow, and the present invention only focuses on the optimization of the address translation process.

In current MMU simulation methods, each load/store instruction is translated into a call to a function that models TLB lookup. The simulated TLB is searched (as shown in FIG. 1) whenever the address translation is needed. If the virtual address is in the TLB, the corresponding physical address may be obtained. If the virtual address is not in the TLB, MMU generates a TLB-miss exception or MMU automatically fills the TLB with the page table read out from the simulated memory. The search result is composed of a virtual page number and a physical page number, wherein, in the case of a 32-bit computer system, in general the virtual page number and the physical page number are both addresses of 32 bit in length, with the lower 12 bits being 0. This is because a 32-bit address may be divided into two parts in a general 32-bit computer system, wherein the higher 20 bits are page numbers, and the lower 12 bits are page offsets (the similar processing may be performed for a 64-bit computer system). The page offset is identical in the virtual address space and the physical address space.

As mentioned above, in a typical instruction distribution pattern, on average ⅓ of all instructions are load/store instructions. Since load/store instructions are so frequently executed, the speed of MMU has direct impact on the whole system's performance. However, since TLB search is a time-consuming process, the operating speed of a simulated MMU may not very fast.

From the view of real hardware, a TLB is a cache in nature. Therefore, a TLB lookup or search algorithm is a cache lookup or search algorithm. Thus, a reference may be referred to John L. Hennessy and David A. Patterson, "Computer Architecture: A Quantitative Approach". In short, a TLB may be looked upon as containing a plenty of lines, each containing a virtual address and a physical address (as shown in FIG. 1).

The two basic TLB search methods are:

(1) If a certain virtual address is known, it is compared in the TLB line-by-line. If a virtual address in one line is the same, the corresponding physical address in the line is returned. If implemented in real hardware, the search speed will be very fast, as hardware may search multiple lines in parallel, for example, search 100 lines or more simultaneously. Thus, no matter how many lines are searched, the time required is equal to the time of searching one line. Such TLB is called as a fully-associated TLB.

(2) Assume that a virtual address can only be placed on a certain fixed line. For example, it may be specified that a virtual address may be placed on the first line if it is divided by 10 with remainder 1, and placed on the second line if the remainder is 2, and so on. In this way, only 10 lines are needed for a TLB. However, it is possible that a plenty of virtual addresses are placed into the same line, resulting in conflicts. Therefore, the usual solution is, the one being used recently is placed on the position. As such, it is convenient for search. For a given virtual address, its corresponding line number is found at first, then whether the virtual address on the line is equal to the given one is determined. If so, it represents that the virtual address is found in the TLB and therefore the physical address contained in this line is returned. Such TLB may be called as a set-associated TLB.

From the view of simulator, the aim of a simulator is to simulate real hardware, thus a simulator is to simulate the above TLB search process. For a fully-associated TLB, it is impossible for software to search in parallel (the overhead of parallel search implemented by software is very large, which is unworthy), thus it can only perform comparison line-by-line, which is often implemented by a program with a loop body. In this way, for a TLB containing 64 lines, the comparison is to be performed 64 times, thus the speed of TLB search is slow. For a set-associated TLB, the line number may be calculated directly and the search is performed thereafter. But the search speed is still not fast enough. In a practical analysis, if the calculation and comparison processes are counted, at least 20 assemble instructions are needed for QEMU to complete the above function.

For example, when the guest ISA is PowerPC and the host ISA is x86, a load/store instruction is translated into about 20 assemble instructions in a well-designed full-system simulator QEMU.

In prior art simulators, however, the speed of MMU simulation in the efficiency of the above instruction translation is still not good enough. Therefore, it is needed to provide a new method and full-system simulator for simulating MMU in order to further reduce the number of instructions after the translation of load/store instructions, thereby improving the operating speed of MMU simulation and full-system simulation.

SUMMARY OF THE INVENTION

In order to overcome the defects existing in prior art, and further improve the speed of MMU simulation, thereby improving the overall system performance, the present invention is proposed.

According to one aspect of the present invention, there is proposed a method for speeding memory management unit (MMU) simulation with direct address mapping on a host system, the host system supporting a full-system simulator on which a guest system is simulated, the method comprising the following steps:

setting a border in the logical space assigned for the full-system simulator by the host system, thereby dividing the logical space into a safe region and a simulator occupying region;

shifting the full-system simulator itself from the occupied original host logical space to the simulator occupying region; and reserving the safe region for use with at least a part of the guest system.

According to another aspect of the present invention, there is proposed an apparatus for speeding memory management unit (MMU) simulation with direct address mapping on a host system, the host system supporting a full-system simulator on which a guest system is simulated, the apparatus comprising:

a border setting means, for setting a border in the logical space assigned for the full-system simulator by the host system, thereby dividing the logical space into a safe region and a simulator occupying region;

a simulator shifting means, for shifting the full-system simulator itself from the occupied original host logical space to the simulator occupying region; and a safe region management means, for reserving the safe region for use with at least a part of the guest system.

According to still another aspect of the present invention, there is proposed a full-system simulator for speeding memory management unit (MMU) simulation with direct address mapping on a host system, comprising the apparatus as described above.

The method, apparatus, and full-system simulator for speeding memory management unit simulation with direct address mapping on a host system proposed by the present invention save much of the address translation process, thereby significantly reducing the host instructions to be executed, and therefore significantly improve the operating speed and system performance of MMU simulation and full-system simulation.

BRIEF DESCRIPTION OF THE DRAWINGS

The novel features believed characters of the invention is set forth in the appended claims. However, the invention itself and its preferred mode, together with further objects and advantages, will be best appreciated from the reading of the following detailed description of the illustrative embodiments taken in conjunction with the drawings, in which:

It is noted that the same or similar labels designate the same or similar elements or components throughout the figures.

DETAILED DESCRIPTION OF EMBODIMENTS

The exemplary embodiments of the invention will be described below in conjunction with the accompanying figures. For clarity and simplicity, not all features of the actual implementation are described in the specification. However, it should be appreciated that many implementation-specific decisions must be made in the procedure of developing any of such actual embodiments in order to realize the particular objectives of developers, for example complying with those limiting conditions in related to systems and businesses, wherein the limiting conditions may be varied depending on the implementation. Further, it should be appreciated that although the development effort may be complicated and time-consuming, such development effort is only routine task for those skilled in the art that benefit from this disclosure.

Moreover, it is further noted that, in order not to obscure the invention by those unnecessary details, only the apparatus structures and/or processing steps in related to the scheme according to the invention are shown in the accompanying figures, while other details not relative to the invention are omitted.

Figure 1:
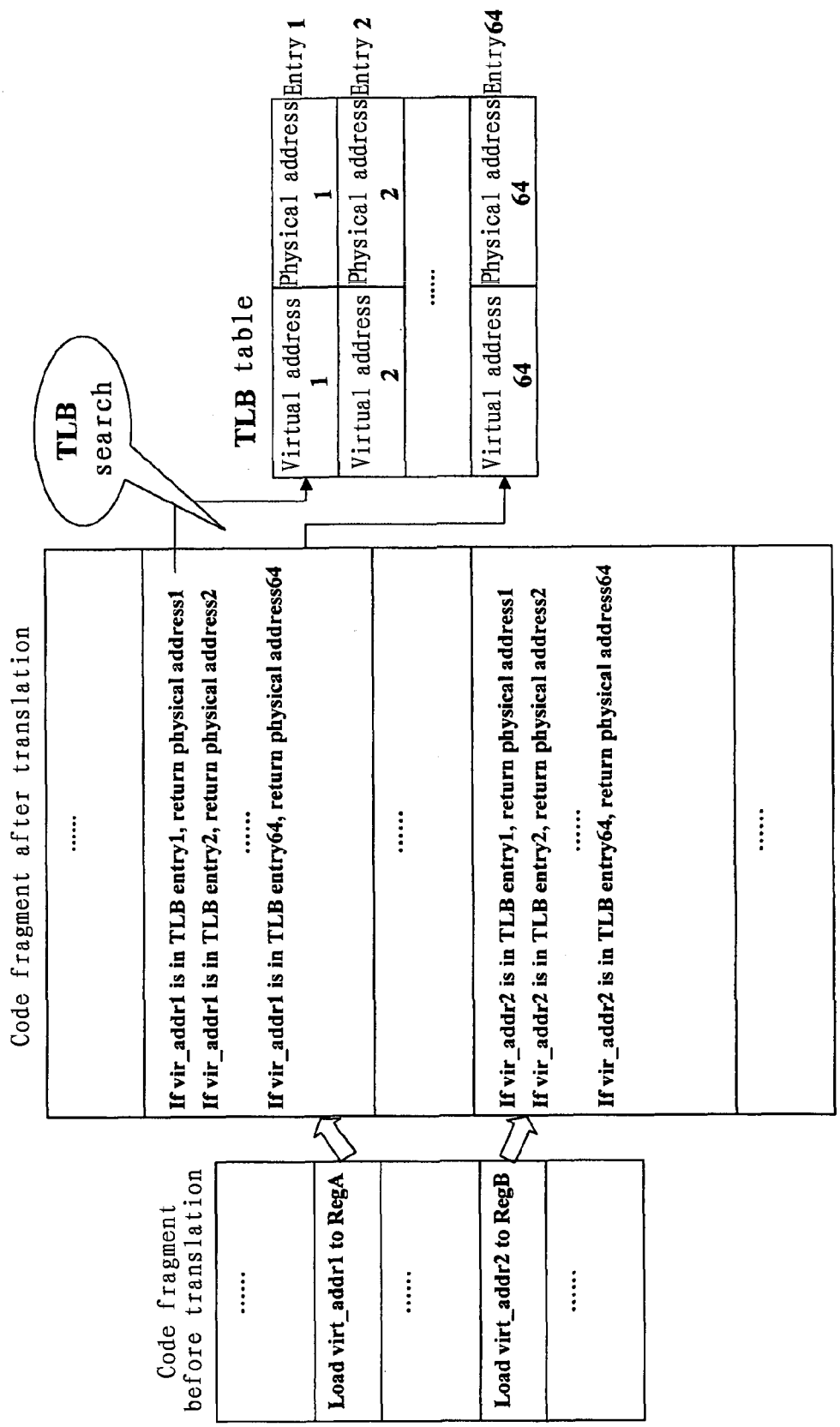
FIG. 1 illustrates the logical structure of a traditional MMU simulation.
Figure 2B:
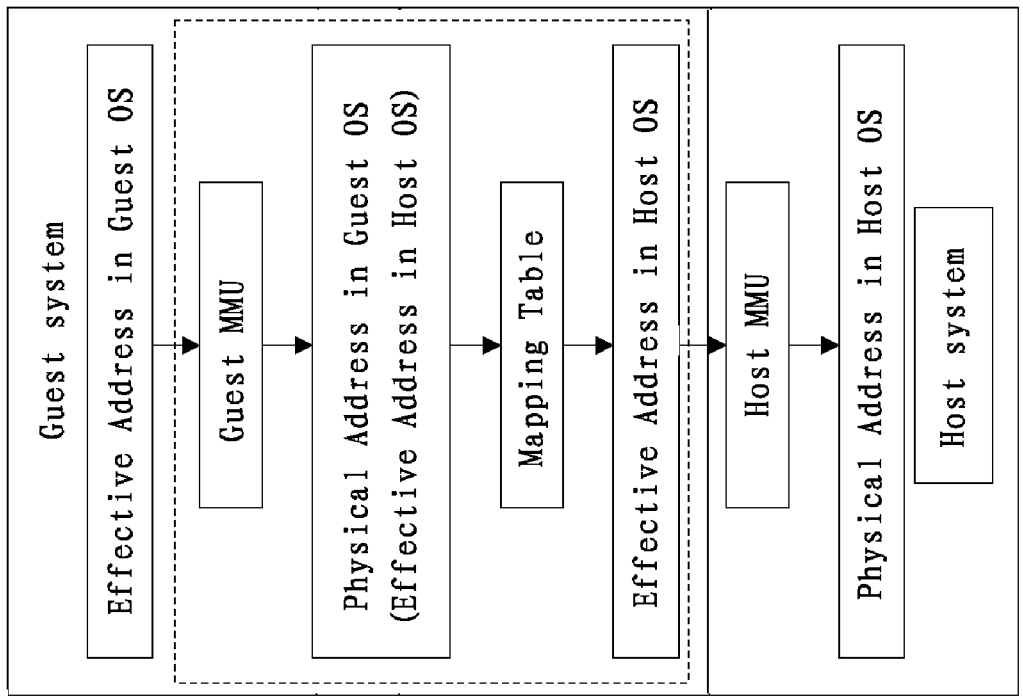
FIGS. 2A and 2B illustrate a traditional address translation mechanism in full-system dynamic binary translation.
Figure 2A:
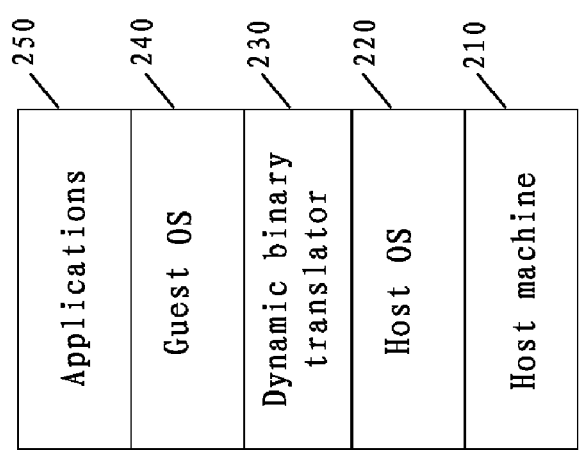

In order to better understand the basic principle of the invention and better practice the invention, first refer to FIGS. 2A and 2B. FIGS. 2A and 2B illustrate a traditional address translation mechanism in full-system dynamic binary translation. In FIG. 2A, there are contained from the bottom up: host machine 210, host operating system (OS) 220, dynamic binary translator 230, guest operating system (OS) 240, and applications 250. In the figure, the host OS 220 is running on the host machine 210. The host OS 220 supports the running of the dynamic binary translator 230. Thereby, with the dynamic binary translator 230, the guest OS 240 and the applications 250 running thereon are supported by the host machine 210 and the host OS 220. In particular, an effective address (EA) to be accessed by the guest OS 240 and the applications 250 running thereon at runtime can be translated by the dynamic binary translator 230 into a physical address (PA) supported by the host OS 220 on the host machine 210.

It is noted that the present invention may be applied to any host machines, and has no specific requirement on the hardware resource and host OS of the host machine. Also, the present invention may support any available guest OS and applications running thereon, and has no requirement on any modification or alternation to them.

FIG. 2B illustrates the address translation mechanism more particularly. When an application is running on the guest system, the instruction therein performs address invocation. The address is called as an effective address (EA) in the guest OS, also called as logical address, which is a virtual address. In the guest MMU (which is also simulated), the invoked effective address is translated into a physical address (PA) in the guest OS, which is still a virtual address, therefore is needed to be translated into an effective address in the host OS (host EA) through a mapping table. In an alternative embodiment, the physical address in the guest OS may directly represent the effective address in the host OS, so that the mapping table is no longer needed. Then, the effective address in the host OS is translated into a physical address in the host OS (host PA) by a host MMU (usually real hardware). As a result, the address invocation performed by the instruction in the application may be completed.

Figure 3:
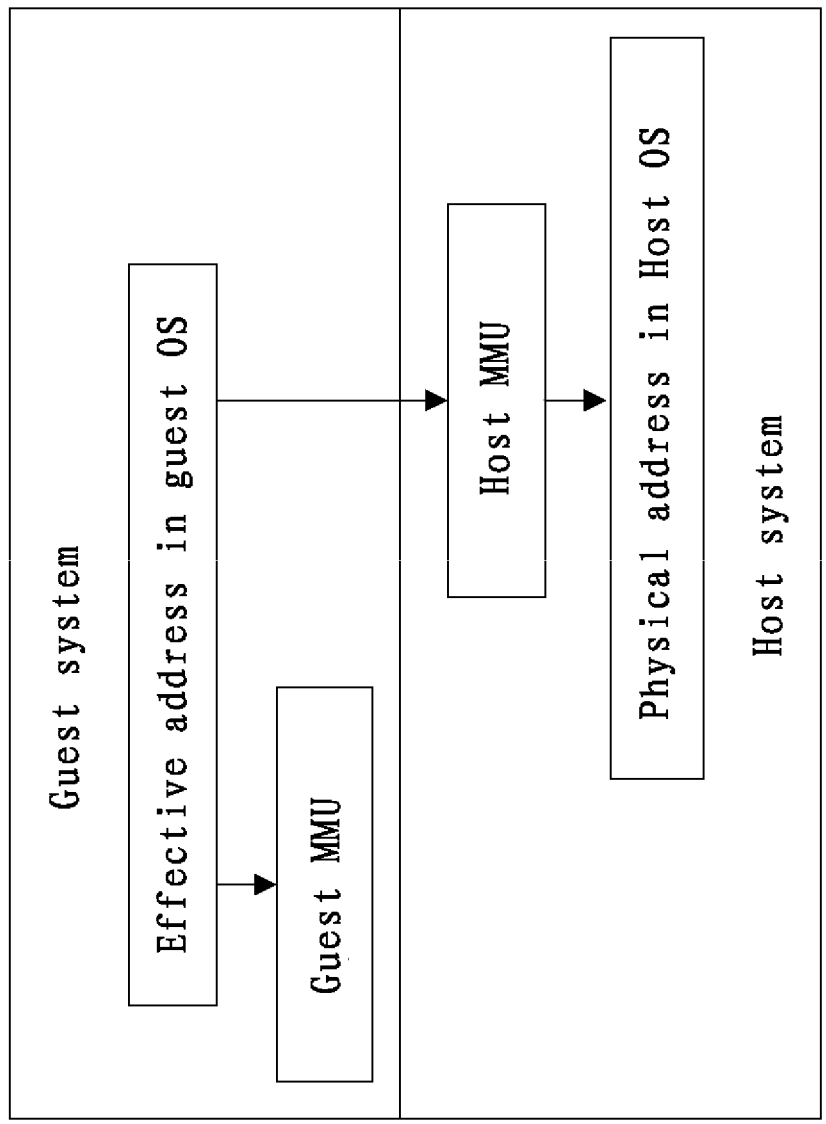
FIG. 3 illustrates a brief pictorial view of an address transformation process according to the invention.

The invention intends to eliminate the address transformation process (as shown in the dashed block) from the effective address in the guest OS (guest EA) to the effective address in the host OS (host EA), so as to reduce the overhead of address translation mechanism and improve the performance of system simulation. FIG. 3 illustrates a brief pictorial view of an address transformation process to be implemented by the invention. It may be readily seen that, by practicing the invention, in most cases, the effective address in the guest OS may be directly passed to the host MMU as the effective address in the host OS, and be mapped to the physical address in the host OS by the host MMU, so that the overhead of address translation by software is completely eliminated, thereby significantly improving the overall operating speed and efficiency of the system. The guest MMU is still remained, for it may be used for processing some instructions that are not handled by the mechanism of the invention. The details will be described later in the following.

Figure 4:
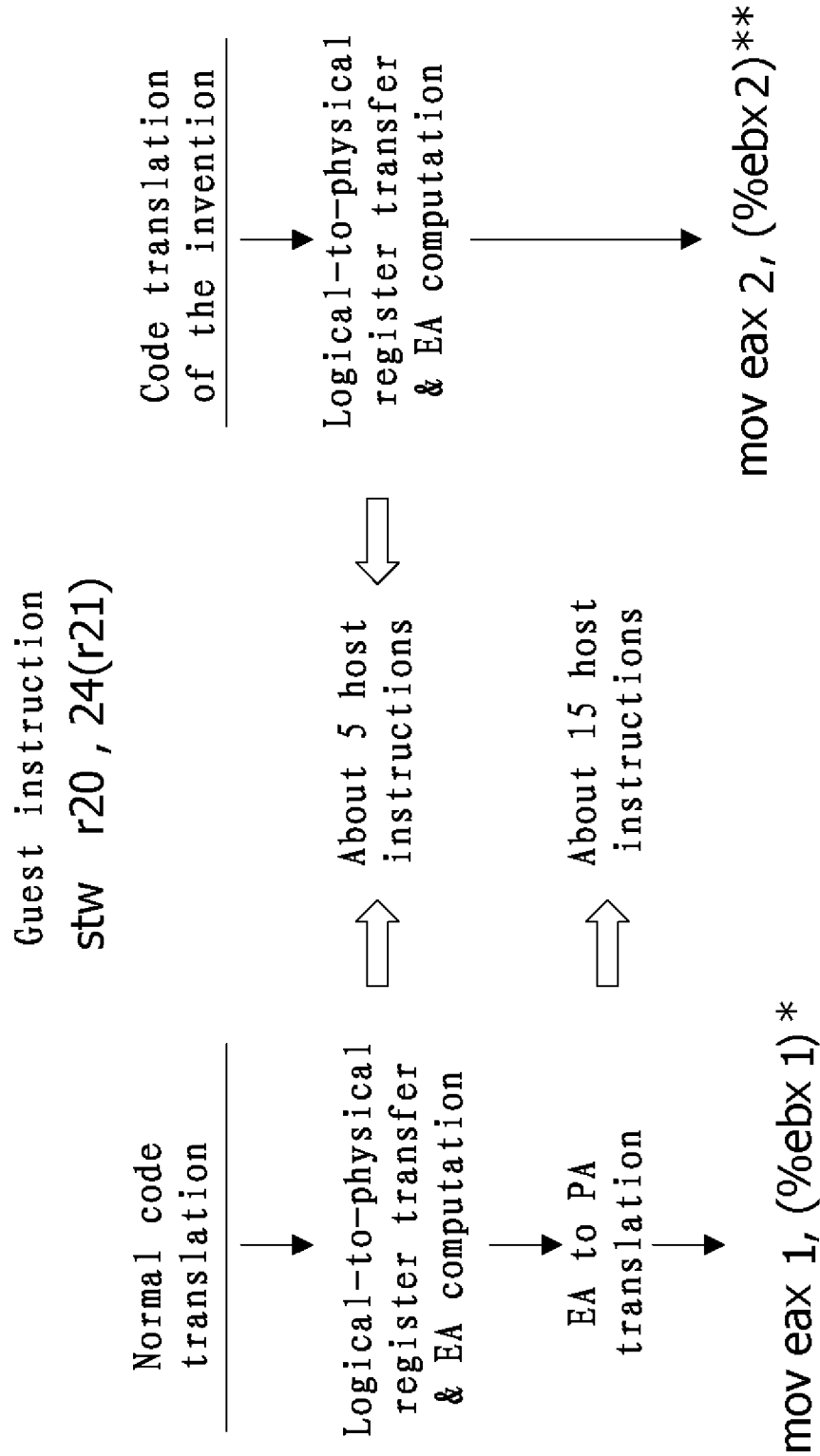
FIG. 4 illustrates a comparison between the normal code translation process and the code translation process of the invention.

A particular example is then shown to explain the effect that can be achieved by the invention. Referring to FIG. 4, FIG. 4 illustrates a comparison between the normal code translation process and the code translation process of the invention. In the case that a PowerPC guest system is simulated on an x86 host machine, for example, a guest instruction running on the guest system is:

stw r20, 24(r21).

The operation of the instruction is to add 24 to the numerical value in the guest register r21 to get an effective address (EA) in the guest system, then to store the value in the guest register r20 into the memory unit corresponding to the effective address. With respect to this instruction, in the normal code translation process, at first the logical-to-physical register transfer and the effective address (EA) computation are performed on the guest system, which will involve about 5 host instructions. Then the translation from guest effective address (guest EA) to guest physical address (guest PA) is performed (as shown in the dashed block in FIG. 2), which will involve about 15 host instructions. After translation, the resulting instruction is:

mov eax1, (%ebx1), wherein, eax1 is a host register, the value therein is equal to the value in the guest register r20, ebx1 is also a host register, the value therein is equal to the guest PA translated from the guest EA, i.e. the host EA (assume that the mapping has been completed or the mapping table is not needed). Afterwards, the host EA will be passed to the host MMU and translated into the host PA.

In comparison with the normal code translation process, in the solution of the present invention, for the same guest instruction:

stw r20, 24(r21), only the logical-to-physical register transfer and the effective address (EA) computation are to be performed on the guest system, which will involve about 5 host instructions. Then as mentioned above, with the mechanism of the invention, the guest EA may be treated as the host EA directly, and the resulting instruction is:

mov eax2, (%ebx2), wherein, eax2 is a host register, the value therein is equal to the value in the guest register r20, ebx2 is also a host register, and the value therein is equal to the guest EA, i.e. the host EA (because they are identical in the embodiment of the invention). Afterwards, the host EA will be passed to the host MMU and translated into the host PA.

It can be seen that the code translation process according to the invention may save almost all of the system overheads introduced by the address translation process from guest EA to host EA, thereby reducing the number of the generated host instructions from about 20 to about 5. In an experiment on QEMU, a prior art DBT simulator, the resulting data shows that the ideal performance gain achieved by implementing the invention could be around 180%.

The basic idea of the invention and the effect to achieve is described above by means of examples. The particular implementation of the invention will be described in detail below in conjunction with the figures.

Since the known solution to MMU simulation is to translate every load/store instruction into a function call that performs TLB lookup, and the TLB lookup is time-consuming, a fact is considered that a simulator running on a host machine will be assigned a large logical space, for example, a simulator running on a 64-bit host machine will occupy a logical space of 264 bytes, and in common cases the simulator only consumes a tiny region thereof, then it can be contemplated that it is possible for the guest system running on a simulator to safely share the logical space with the simulator itself. Thus, it is not necessary for the simulated MMU to perform TLB lookup when the guest system is executing every load/store instruction. Instead, the guest EA directly corresponds to the host EA. Then, the address translation process from host EA to host PA is performed by a host MMU (hardware in the host CPU). Therefore, the address translation process from guest EA to host EA in prior art is bypassed, thereby saving abundant system overheads.

In particular, a certain border may be set in the logical space region assigned for the simulator, so that the simulator may shift its own codes and data to a logical space region higher than the border, and reserve the region lower than the border as a safe region for use with the simulated guest system, wherein the border is a specific logical address. Thus, a guest EA used in the guest system which is lower than the border (i.e. sits in the safe region) may be considered as a host EA in the host system, and may be directly mapped to a host PA by the host MMU. In this way, the workloads of TLB lookup and EA-to-PA translation performed by the simulated guest MMU can be thoroughly removed for almost all load/store instructions accessing an address in the safe region in the simulated guest system. As long as the safe region is large enough to hold the whole guest system, nearly all TLB lookups are never needed. For example, in the case that a 32-bit guest system is simulated on a 64-bit host machine, since the address space assigned for the simulator is far larger than the address space that the 32-bit guest system requires, a safe region that is large enough to hold the whole guest system can be reserved for the guest system in the assigned address space. While in the case that a 64-bit guest system is simulated on a 64-bit host machine, although it is not possible to reserve for the guest system a safe region that may hold the whole guest system, the safe region may be available for part of the guest system. This is achieved by an address safety judgment mechanism. If an address to be accessed by a load/store instruction does fall in the safe region, the method of the invention will work well. If the address to be accessed by a load/store instruction does not fall in the safe region, a normal address translation method is used, i.e. a TLB lookup and EA-to-PA translation process of the guest MMU is invoked. In the following particular embodiments followed, for ease of description and understanding, it is assumed that the host machine is 64-bit without otherwise specifying explicitly, although the present invention may be identically applied on a 128-bit, 32-bit host machine, for example.

It is noted that although the safe region is set below the border in the preferred embodiment of the invention, it is not obligatory. It is readily appreciated for the skills in the art that, in an alternative embodiment, the safe region may be located above the border, while the space occupied by the simulator is set below the border.

Figure 5:
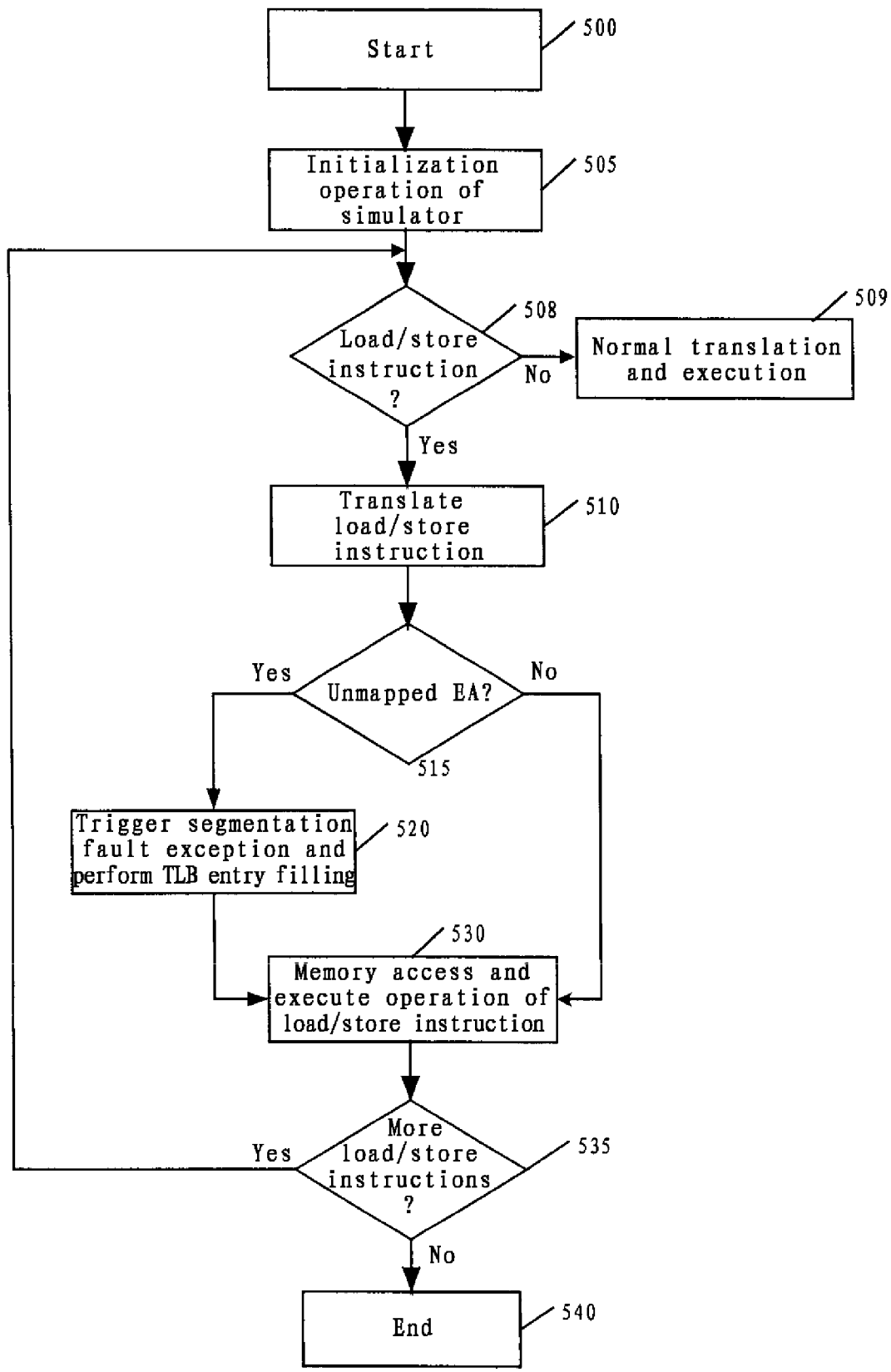
FIG. 5 is an overall flowchart of an exemplary simulator operation according to a preferred embodiment of the invention.

The method of the invention will be described in detail as below. Now referring to FIG. 5, FIG. 5 is an overall flowchart of an exemplary simulator operation according to a preferred embodiment of the invention. Initially the process of the method starts at Step 500, and proceeds to Step 505, in which an initialization operation of the simulator is conducted. The initialization operation can mark off a safe region from the logical space assigned for the simulator by the host system in accordance with the set border, and place the guest system and the simulator itself into the safe region and the region higher than the safe region (may be called as a simulator occupying region), respectively. The particular flow of the initialization operation will be described as below with respect to FIG. 6.

Figure 6:
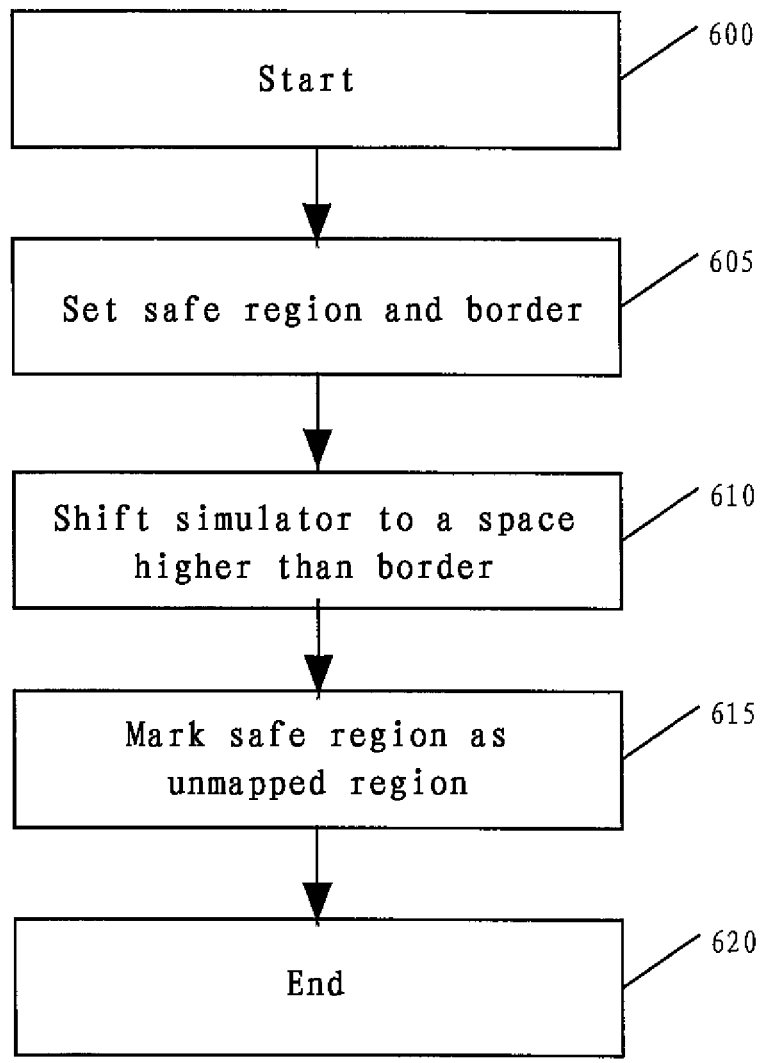
FIG. 6 is a flowchart of an initialization operation of the simulator.

Now referring to FIG. 6, FIG. 6 is a flowchart of an initialization operation of the simulator. Initially the initialization operation starts at Step 600, and proceeds to Step 605, in which a border and a safe region is set, wherein the safe region is a region lower than the border in the logical space assigned for the simulator. Thus, as described above, for the logical space region assigned for the simulator by the host system, besides the simulator occupying region can be used to hold the simulator itself, the safe region can be used to hold at least part of the simulated system.

In the case of the simulated system (i.e. guest system) is 32-bit, the border of the safe region is set fixedly to 0xFFFFFFFF, i.e. the 4 G bytes from 0xFFFFFFFF to 0x00000000 in the host logical space assigned for the simulator is set to the safe region for use with the guest system. As the guest system is 32-bit, the set 4 G safe region is large enough to hold the space required by the whole guest system.

In the case of the simulated system (i.e. guest system) is 64-bit, the border of the safe region is set to a specific address. The setting of the address depends on the size occupied by the simulator itself and the size required by the guest system and its applications simulated thereon. In general, the border may be set to an address higher than 0xFFFFFFFF, so as to create a larger safe region. The larger the safe region is, the larger the space available to the guest system is, so that more performance improvement can be achieved.

Figure 7:
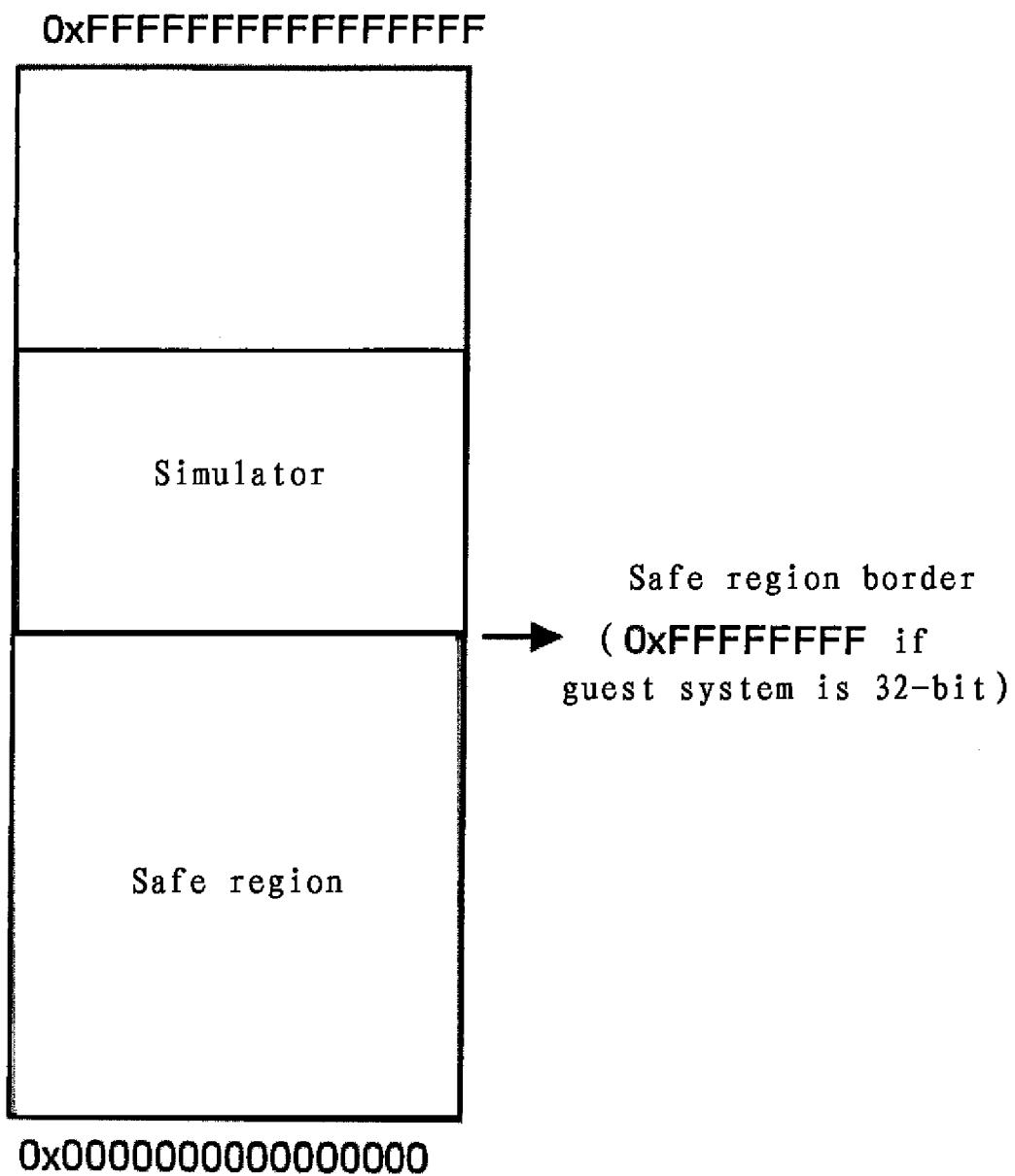
FIG. 7 illustrates a distribution of the simulator itself and the safe region in the host logical space assigned for the simulator.

After the border is set in Step 605, i.e. the size of the safe region is determined, the operation then proceeds to Step 610, in which the simulator itself is shifted from the occupied original host logical space (which stores the codes and data of the simulator) to the space higher than the border. Said border is either 0xFFFFFFFF in the case of a 32-bit guest system or a specific address in the case of a 64-bit guest system. FIG. 7 illustrates a distribution of the simulator itself and the safe region in the host logical space assigned for the simulator after the completion of Step 610. In the host logical space assigned for the simulator by the host system, the simulator and the safe region are divided into two parts by the border. The upper part is the simulator occupying region for storing the codes and data of the simulator, while the lower part is the safe region for use with the guest system. As described above, in an alternative embodiment, the simulator occupying region may be located below the border, while the safe region may be located above the border, and the border at the time will be another value.

In some situations, the simulator cannot be shifted due to some technical reasons. For example, the simulator needs to invoke a function at a fixed address in the safe region or a function having a pointer to a fixed address in the safe region. At this point, it is not necessary to shift the simulator. Instead, the simulator is reserved at the original position and the safe region is shifted to a higher-addressed space. For the translation pattern of a load/store instruction running on the guest system, an addition operation or instruction just after the completion of the effective address (EA) computation may be injected into the translation pattern. Thus, in the future whenever a load/store instruction occurs, the addition operation or instruction attaches an address offset to the original guest EA to be accessed by the load/store instruction, thereby directing the logical address to be accessed by the guest system to the safe region located in a higher-addressed space. Since such operation only adds one addition operation or instruction to each load/store operation, thereby introducing an insignificant extra overhead, such specific situation makes little impact on the system performance. In the following description, therefore, for simplicity and ease of understanding, it is assumed that such situation does not occur, i.e. no address offset would be attached to the guest EA.

Then, returning to the initialization operation of FIG. 6, the operation proceeds to Step 615, in which the safe region is marked as an unmapped region, i.e. all addresses in the safe region are marked as unmapped addresses. The purpose thereof is that the first access to an address in this region by any instruction will find out an unmapped address, thereby triggering a segmentation fault exception. A further guest TLB filling operation may be performed after triggering the exception, which will be described in detail hereinbelow. After Step 615, the initialization operation ends at 620.

Now returning to the process of FIG. 5, after the initialization operation of the simulator completes in Step 505, in the instruction translation and execution flow, it is determined whether the instruction to be executed by the simulator is a guest load/store instruction in Step 508. If not, the normal translation and execution operation is performed on the instruction in Step 509. Otherwise, if the instruction is a guest load/store instruction, the instruction is translated and the corresponding host instructions, i.e., a plurality of host instructions for simulating the guest load/store instruction, are generated in Step 510, as described above. The host instructions are used for performing the logical-to-physical register transfer and guest effective address (EA) computation on the host system, wherein the guest EA will be used for accessing the host physical address space. It is noted that Step 510 is an optional step. Only at the first time each particular load/store instruction occurs, it needs translating. After a load/store instruction is translated at the first time, the translated host instructions may be stored in a storage means, such as a translation cache module in the simulator. In this way, at next time the instruction is invoked, the translated instructions may be invoked from the translation cache module directly, i.e. Step 510 may be bypassed.

At this point, a mechanism for mapping a guest logical page to a host logical page and simulating the guest TLB status is needed. The operation then proceeds to Step 515, in which the host MMU checks whether the guest EA is unmapped. If the determination result is positive, the operation proceeds to Step 520, in which a segmentation fault exception is triggered, and a guest TLB entry filling operation is performed after triggering the segmentation fault exception. It is noted that any address in the safe region is under an unmapped status when it is first accessed. Therefore it is certain to trigger a segmentation fault exception and perform a guest TLB entry filling operation afterwards. The particular flow of the TLB entry filling operation is described below with respect to FIG. 8.

Initially it is noted that the reason to fill the guest TLB entry is mainly that the information in the guest TLB is needed during the execution of the guest operating system, and the guest TLB is to be operated. Thus it should be guaranteed that the status in the guest TLB should be consistent with its actual status. The actual status herein refers to the status in the TLB while the guest operating system is running on real host CPU hardware. Since it is usual that the TLB status changes only when performing an entry filling or entry invalidating operation on it, the two operations need simulating. Moreover, as long as the two operations are simulated properly, it can be guaranteed that the status of the guest TLB is consistent with its actual status.

The TLB entry filling operation occurs at the first time when a logical page where a guest EA locates is accessed. Thus, it is needed to capture the time the page is first accessed. To this end, it is needed to initialize all guest EAs (also host EAs in fact) as unmapped. In this way, when a guest EA is accessed, if the page where the guest EA locates has never been accessed, i.e. the guest EA is unmapped, this is the time when the page is first accessed. Thus, the guest TLB entry filling operation may be simulated in the triggered exception service process. Meanwhile, in the host MMU, a mapping relationship from the host EA to the host PA is also established. That is, the time when the guest TLB entry filling operation occurs is just the time when the mapping relationship from the host EA to the host PA is established.

Figure 8:
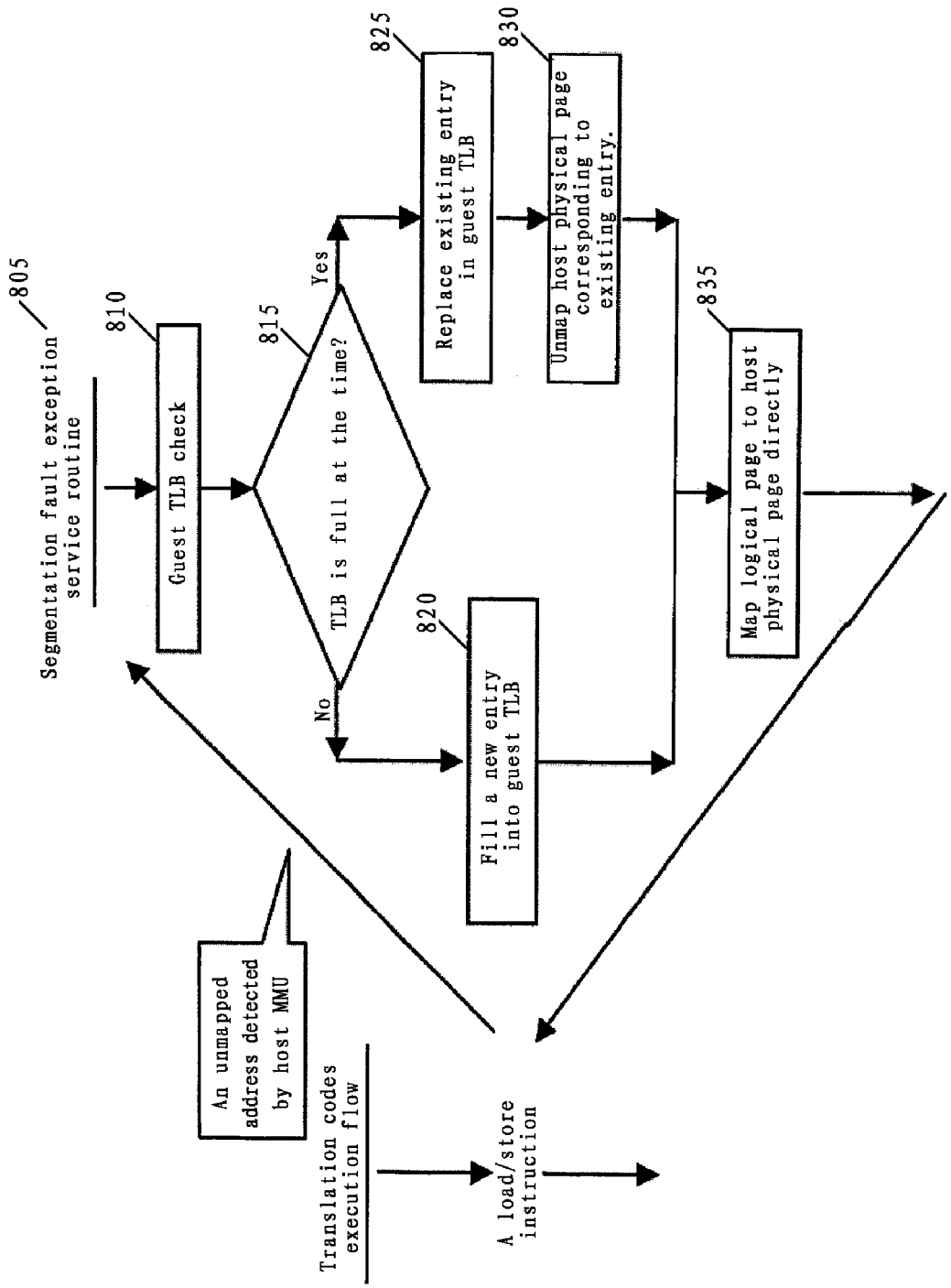
FIG. 8 illustrates a flowchart of a TLB entry filling operation after triggering a segmentation fault exception.

Now referring to FIG. 8, FIG. 8 illustrates a flowchart of a TLB entry filling operation after triggering a segmentation fault exception. The TLB entry filling operation comprises the operations of adding a new TLB entry and updating an existing TLB entry. In the translation codes execution flow, when the simulator encounters and executes a load/store instruction, if the host MMU detects that the original guest EA used by the instruction is an unmapped address, a segmentation fault exception is triggered, Step 805. Then a TLB entry filling operation is performed, which is a service routine, in which the guest TLB operation will be simulated. At first, in Step 810, a guest TLB check is performed. Then in Step 815, it is determined whether the TLB is full at the time. If the determination result is negative, a new entry is filled into the guest TLB in Step 820. Then in Step 835, the logical page including the original guest EA is directly mapped to a host physical page by the host MMU. If the determination result is positive in Step 815, an existing entry in the guest TLB is replaced with a new entry in Step 825, and the physical page in the host memory corresponding to this existing entry is unmapped in Step 830. Then in Step 835, the logical page including the original guest EA is directly mapped to a host physical page by the host MMU. In this way, it is possible for a load/store instruction to perform memory access and execute the corresponding operation of the load/store instruction, as described in detail hereinbelow. When the next time the guest EA in the logical page is accessed, the guest EA has become a mapped address. So the load/store instruction may directly access the corresponding location of the host memory through the guest EA without triggering any exception. The guest TLB will not be accessed in all the normal accesses to the memory, but is needed to be accessed only when simulating the operations of guest TLB entry filling and entry invalidating.

Further, in fact, in an alternative embodiment, if the guest system itself can guarantee that a page table entry will not be modified when it is not in the TLB (for example, it is temporarily stored in a register), then a technology for further optimizing the method of the invention may be implemented. That is, when the guest TLB is full and a new TLB entry is to be added, the new entry is directly added into the guest TLB without the efforts of TLB entry replacement and physical page unmapping. The reason thereof is that, in the simulation process, the guest TLB is essentially a software data structure, which can hold more entries than an actual predetermined number, and also the host TLB could be larger than the guest TLB. Therefore, it is possible to simulate a guest TLB larger than its actual size to hold more TLB entries concurrently and avoid the overheads of related TLB entry replacement and physical page unmapping. In theory, the size of the simulated guest TLB may achieve at most that of the host TLB.

When a plurality of applications are running on the guest system, and application switch occurs (i.e. to switch one application to another), the mapping relationship from a logical page to a host physical page will be changed. While when the previous application is switched back, the mapping relationship will be changed again. If such switch occurs frequently, it is certain to result in a significant increase of system overhead and influence the overall performance. Therefore, another optimization technology is to save the mapping relationship from the previous application related logical page to the host physical page into an additional space (for example a register) and remain unchanged when the previous application is switched, so that such mapping relationship may be applied instantly when the application is switched back.

As described above, after the TLB entry filling operation completes, an address that was originally in an unmapped status is saved into the guest TLB, so that in the later invocation to the address, it can be applied directly.

Now returning to FIG. 5, after the TLB entry filling operation in Step 520 completes, or if the determination result in Step 515 is negative, i.e. the guest EA to be used is mapped, the operation proceeds to Step 530, in which, based on the particular function of the load/store instruction, the memory access is performed and the corresponding operation of the load/store instruction is executed.

Figure 9:
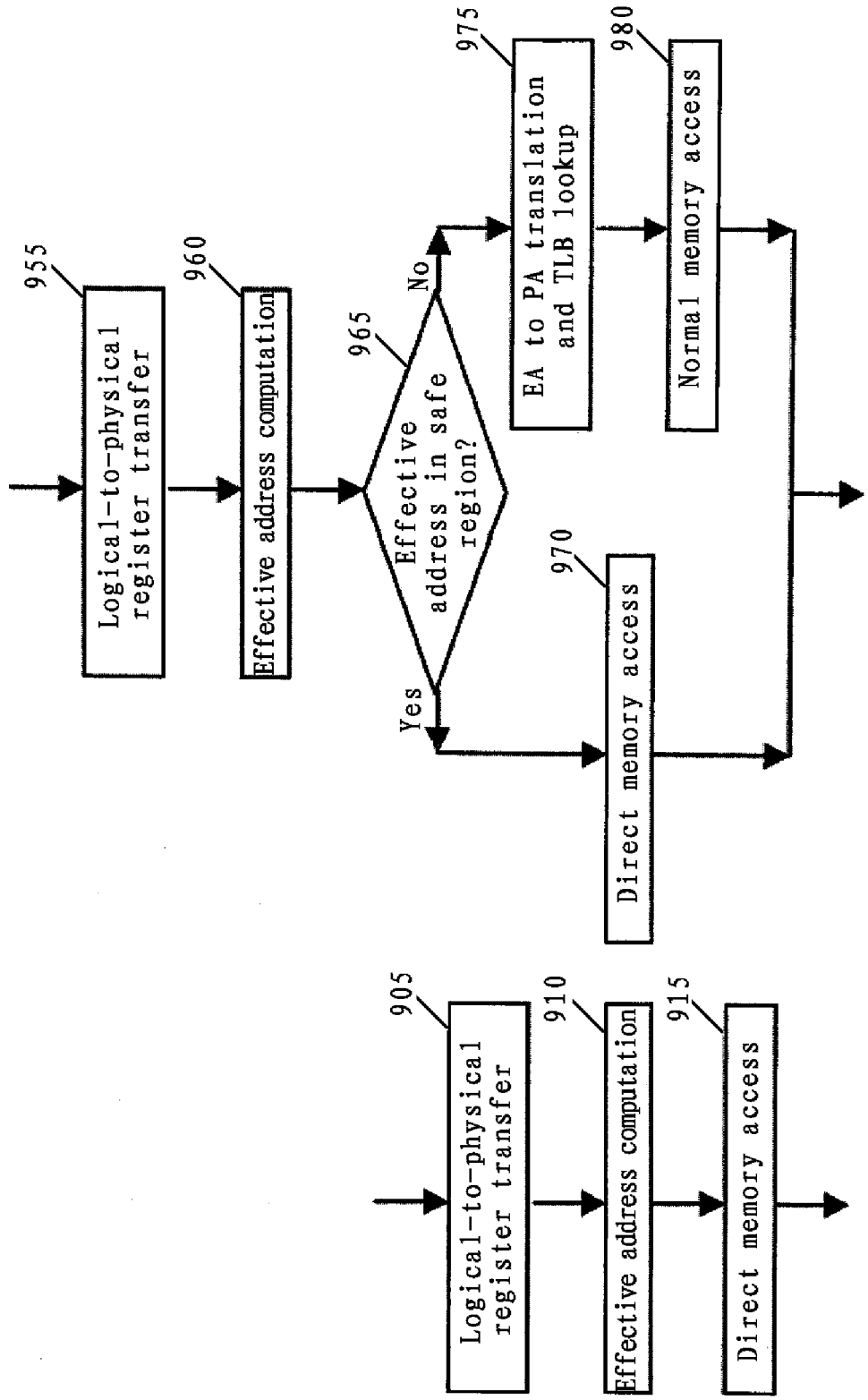
FIGS. 9A and 9B are flowcharts describing the translation and execution of a load/store instruction with respect to a 32-bit guest system and a 64-bit guest system, respectively.

For clearer understanding, the particular flow of the translation and execution of a load/store instruction is described below with reference to FIGS. 9A and 9B. FIGS. 9A and 9B are flowcharts describing the translation and execution of a load/store instruction with respect to a 32-bit guest system and a 64-bit guest system, respectively. Note that only when an unmapped guest EA appears a segmentation fault exception will be triggered and the following guest TLB entry filling process will occur. And this guest EA will be mapped when being accessed afterwards. Therefore, such operation is omitted in FIGS. 9A and 9B.

In the flow with respect to a 32-bit guest system in FIG. 9A, first in Step 905, the logical-to-physical register transfer is performed on the guest system. Then in Step 910, the effective address (EA) computation is performed. The computed EA is a guest EA. The two steps may be performed during Step 510 in FIG. 5. They are known in prior art and will not further described herein. Since a 32-bit guest system may be completely held in the safe region as mentioned above, a determination whether the guest EA is in the safe region is not needed. Then in Step 915, the direct memory access is performed. Since the computed guest EA may be directly used as a host EA on the host machine, the direct memory access can be performed through the host EA by the host MMU. Thereafter, the execution of the load/store instruction completes.

In the flow with respect to a 64-bit guest system in FIG. 9B, first in Step 955, the logical-to-physical register transfer is performed on the guest system. Then in Step 960, the effective address (EA) computation is performed. The computed EA is a guest EA. The two steps, which are same as Step 905 and 901 in FIG. 9A, may be performed during Step 510 in FIG. 5. Since a 64-bit guest system may not be completely held in the safe region as mentioned above, it is determined whether the guest EA is in the safe region in Step 965. If the determination result is positive, then in Step 970, the direct memory access is performed. Same as Step 915 in FIG. 9A, since the computed guest EA may be directly used as a host EA on the host machine, the direct memory access can be performed through the host EA by the host MMU. If the determination result is negative in Step 965, the guest EA is not in the safe region so that the mechanism of the invention cannot be applied. Then following the traditional address translation flow, in Step 975 the translation from guest EA to guest PA and the TLB lookup are performed by the simulated guest MMU, and in Step 980 the normal memory access is performed through the translated guest PA (identical to a host EA or may be mapped to a host EA). Thereafter, the execution of the load/store instruction completes. Since a safe region check is embedded into the flow of FIG. 9B, and the check itself introduces some overheads, the performance gain that can be achieved by implementing the method of the invention when simulating a 64-bit guest system depends on how many effective addresses to be accessed fall into the safe region.

Returning to the process of FIG. 5, the memory access and the operation of the load/store instruction complete in Step 530. Then in Step 535 it is determined whether there is more load/store instruction. If so, the operation loops back to Step 510, continuing to process the next load/store instruction. Until there is no more load/store instruction, the operation ends in Step 540.

Moreover, when the mapping from the guest logical page to the host physical page changes, in order to guarantee a correct mapping relationship and cause the status of the guest TLB to be consistent with its actual status, it is needed to be aware of the occurrences of all guest TLB entry invalidation operations, so as to perform unmapping work timely. This can be achieved by inserting a code fragment into the translation pattern of all TLB invalidation instructions, as shown in FIG. 10.

Figure 10:
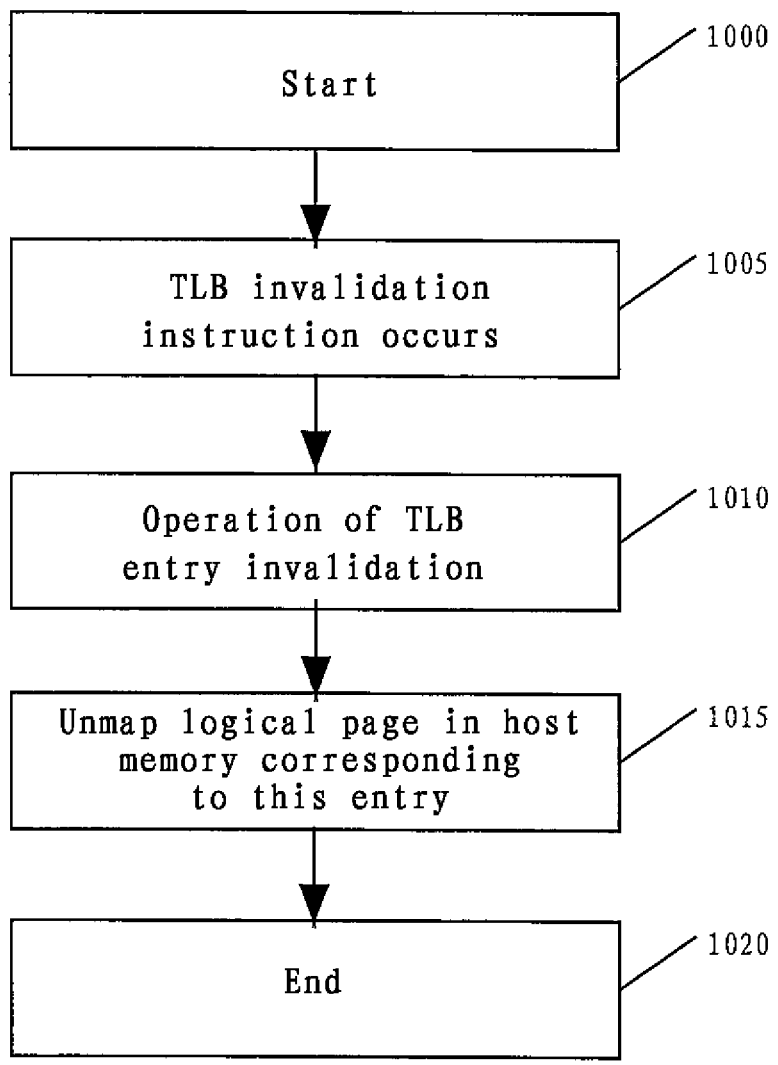
FIG. 10 illustrates a flowchart of an operation of invalidating a guest TLB entry.

Now referring to FIG. 10, FIG. 10 illustrates a flowchart of an operation of invalidating a guest TLB entry. At first a specific code fragment is inserted into the translation pattern, so that the unmapping work may be performed immediately after invalidating a TLB entry. Initially the operation starts at Step 1000, and proceeds to Step 1005, in which a TLB invalidation instruction occurs in the guest instruction execution flow. After the TLB invalidation instruction is found, said code fragment starts to perform the operation of guest TLB entry invalidation, Step 1010. That is, the related TLB entry is turned to an invalid entry. In Step 1015 the logical page in the host memory corresponding to this entry is unmapped. Then the operation ends in Step 1020. By means of the operation of invalidating a guest TLB entry, the mapping relationship of the host memory is maintained synchronized with the status of the guest TLB.

Figure 11:
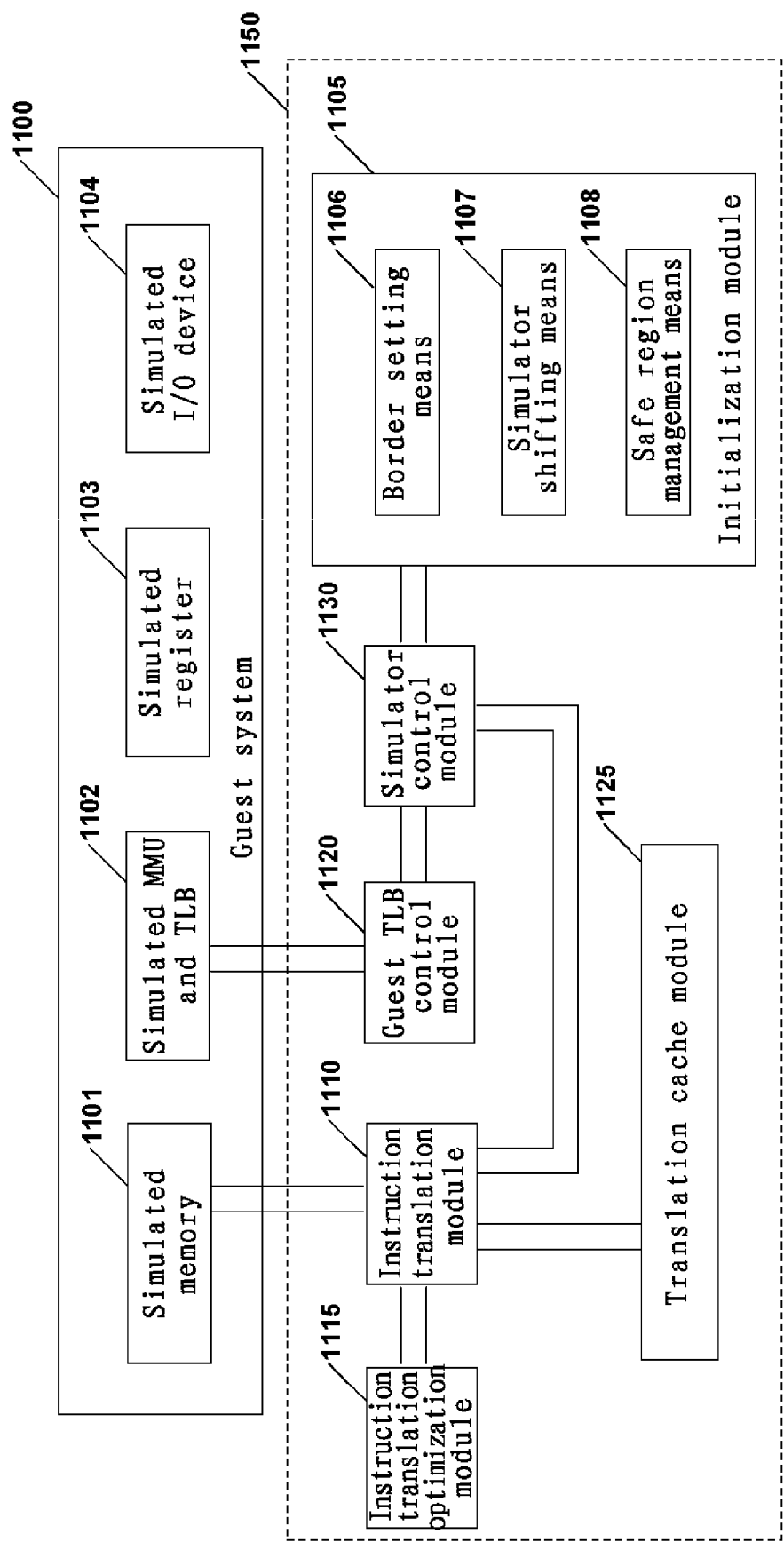
FIG. 11 illustrates a block diagram of a full-system simulator according to the invention.

A method for speeding MMU simulation with direct address mapping on the host system according to the present invention is described in detail hereinabove. Under the same inventive concept, there is provided an apparatus and a full-system simulator for speeding MMU simulation with direct address mapping on the host system. FIG. 11 illustrates a block diagram of a full-system simulator according to the invention. As shown in FIG. 11, the full-system simulator comprises a guest system 1100 and a dynamic binary translator 1150 according to the invention. The apparatus designed for the method for speeding MMU simulation with direct address mapping on the host system according to the invention is employed in the dynamic binary translator 1150. The apparatus is mainly comprised of an initialization module 1105, an instruction translation optimization module 1115, and a guest TLB control module 11120.

The guest system 1100 is the guest system simulated on the full-system simulator according to the invention, which provides all elements necessary for running an operating system and applications thereon, comprising: a simulated memory 1101, a simulated MMU and TLB 1102, a simulated register 1103, and a simulated I/O device 1104.

Wherein, the simulated memory 1101 is a virtual memory assigned by the host machine. The operating system and applications in the guest system are stored in the simulated memory. From the view of the simulated guest system, the simulated memory 1101 looks as if it is a physical memory in a real machine. The simulated MMU and TLB 1102 can simulate the function of address translation. The simulated register 1103 can simulate a register in the guest system. For example, if the guest system is x86, the simulated register may comprise eax, ebx, etc; if the guest system is PowerPC, the simulated register may comprise r0, r1, etc. The simulated register 1103 performs simulation on the host system with some integers of 32-bit or 64-bit. The simulated I/O device 1104 is similar to a serial port, a physical interface card, etc.

Since it is generally needed for the guest system to have the functions of such devices, a full-system simulator must simulate those devices. Of course, depending on design requirements, the full-system simulator can also simulate other devices, which are not shown for simplicity herein.

As shown in FIG. 11, the dynamic binary translator 1150 according to the invention further comprises: an initialization module 1105, an instruction translation module 1110, an instruction translation optimization module 1115, a guest TLB control module 1120, a translation cache module 1125, and a simulator control module 1130. As described above, the initialization module 1105, the instruction translation optimization module 1115, and the guest TLB control module 1120 constitute the apparatus for speeding MMU simulation with direct address mapping on the host system according to the invention.

The initialization module 1105 is used for performing the initialization operation of the simulator. The initialization module 1105 further comprises: a border setting means 1106, a simulator shifting means 1107, and a safe region management means 1108. In particular, the border setting means 1106 is used for setting a border in the logical space assigned for the full-system simulator by the host system, thereby dividing the logical space into a safe region and a simulator occupying region (wherein in a preferred embodiment the safe region is the region located lower than the border in the logical space); the simulator shifting means 1107 is used for shifting the full-system simulator itself from the occupied original host logical space to the simulator occupying region; and the safe region management means 1108 is used for reserving the safe region for use with at least part of the guest system, and marking the set original safe region as unmapped region.

The instruction translation module 1110 is same as an instruction translation module in a traditional full-system simulator. That is, it translates the instruction to be executed and passes the instruction to the translation cache module 1125 for storage. When encountering a load/store instruction in the guest instructions, it passes the instruction to the instruction translation optimization module 1115 for translation.

The instruction translation optimization module 1115 is responsible for, when the instruction translation module 1110 encounters a load/store instruction of the guest system, translating such instruction by employing the load/store instruction translation pattern proposed by the invention, and passing the codes generated after translation back to the instruction translation module 1110. The particular flows of the translation pattern may be referred to FIG. 5, FIGS. 9A and 9B in conjunction with the above corresponding descriptions, and thus will not be described in detail herein.

The guest TLB control module 1120 is responsible for managing the simulated TLB, comprising filling a new TLB entry, updating a TLB entry, and invalidating an existing TLB entry. The object of said operations is to guarantee that the status of the guest TLB is consistent with its actual status. The particular flows of the operations may be referred to FIG. 8, FIG. 10 in conjunction with the above corresponding descriptions, and thus will not be described in detail herein.

The simulator control module 1130 is used for scheduling and controlling the operations of respective modules in the simulator execution process.

A method, apparatus, and full-system simulator for speeding MMU simulation with direct address mapping on the host system according to the present invention is described in detail hereinabove. It is noted that since the TLB does not work in a real-address mode, the method, apparatus, and full-system simulator of the invention does not work in this mode. Thus, when the simulated guest system (usually a legacy system) is running in a real-address mode, the method, apparatus, and full-system simulator according to the invention only performs the normal translation of load/store instructions. After the guest system switches into a protected-address mode, the method, apparatus, and full-system simulator according to the invention can optimize the memory access, thereby providing improved performance. This means that the present invention can be completely compatible with legacy systems. In fact, since modern computer systems run rarely in a real-address mode, this design scheme has minor impact on the simulation performance.

Some experiment results of performance improvement by the invention are shown below. Table 1 shows the experiment results obtained from running dhrystone and bzip2 on simulators with and without implementing the invention, respectively, in the case that a 32-bit guest system is simulated on a full-system simulator QEMU. The experiment results are the data obtained from Benchmark testing software, wherein dhrystone and bzip2 are software applications running for test. In this case, all load/store instructions can bypass the traditional translation process from guest effective address to host effective address, and perform host memory access directly through guest effective addresses.

TABLE 1

| Benchmark | Execution time (sec.) | | Speed-up |
|---|---|---|---|
| | Full-system (original) | Full-system (optimized) | |
| dhrystone | 184.6 | 102.3 | 1.8 |
| bzip2 | 988.4 | 498.3 | 2.0 |

It can be seen from Table 1 that the full-system simulator optimized by the invention can significantly reduce code execution time, thereby achieving a faster code execution speed than the traditional full-system simulator. Wherein, as shown in Table 1, the speed improvement achieved when dhrystone is running is 1.8 times than usual, while the speed improvement achieved when bzip2 is running is 2.0 times than usual.

Table 2 shows the experiment results obtained from running dhrystone and bzip2 on simulators with and without implementing the invention, respectively, in the case that a 64-bit guest system is simulated on a full-system simulator QEMU. In this case, only part of load/store instructions can bypass the traditional translation process from guest effective address to host effective address and perform host memory access directly through guest effective addresses, while other load/store instructions will perform the traditional translation process.

TABLE 2

| Hit ratio (%) | dhrystone | | | bzip2 | | |
|---|---|---|---|---|---|---|
| | Execution time (sec.) | | Speed-up | Execution time (sec.) | | Speed-up |
| | original | optimized | | original | optimized | |
| 0 | 184.6 | 210.3 | 0.9 | 988.4 | 1111.3 | 0.9 |
| 20 | | 172.7 | 1.1 | | 869.7 | 1.1 |
| 40 | | 169.0 | 1.1 | | 839.3 | 1.2 |
| 60 | | 127.0 | 1.5 | | 739.3 | 1.3 |
| 80 | | 126.3 | 1.5 | | 691.3 | 1.4 |
| 100 | | 127.0 | 1.5 | | 619.7 | 1.6 |

It can be seen from Table 2 that the performance gain depends on the proportion (hit ratio) of the guest system that falls in the safe region in the experiment results. As described above, the higher the proportion of the accessed guest addresses that falls in the safe region is, the higher the obtained performance gain is. When the proportion (hit ratio) of the accessed guest addresses that falls in the safe region is 0, the full-system simulator optimized by the invention shows no performance improvement. Because in the process of processing load/store instructions, the address translation is performed according to the normal method, and extra instruction overheads are further introduced (referring to FIG. 9B), the system performance is influenced minutely instead. Along with the increasing proportion (hit ratio) of the accessed guest addresses that falls in the safe region, the performance improvement by the invention is increasing. In an extreme case, when the proportion (hit ratio) of the accessed guest addresses that falls in the safe region is 100%, which is same as the case of simulating a 32-bit guest system, all load/store instructions can bypass the traditional address translation process and perform host memory access directly. Thus the full-system simulator optimized by the invention can significantly reduce the code execution time, thereby achieving a faster speed than the original full-system simulator. Wherein, as shown in Table 2, the maximum speed improvement achieved when dhrystone is running is 1.5 times than usual, while the maximum speed improvement achieved when bzip2 is running is 1.6 times than usual. It is noted that it is practically impossible that the event in which the hit ratio is 0 occurs under normal circumstances. Further, it is the programmer or administrator who can determine which parts of the guest system will be placed into the safe region. Thus the hit ratio is programmatically controllable. So the hit ratio may be set to a higher level in the design and programming stage, thereby guaranteeing the system performance improvement by implementing the invention.

The detailed descriptions of the method, apparatus, and full-system simulator for speeding MMU simulation with direct address mapping on the host system of the invention are provided hereinabove with reference to the embodiments. Although only the cases that a 32-bit or 64-bit guest system is simulated on a 64-bit host machine are introduced in the preferred embodiments described above, it is readily appreciated by a person with ordinary skills in the art that the invention may be identically applied in the case that a guest system is simulated on a host machine of any bits, in which the bit number of the guest system is less than or equal to that of the host machine, for example a 64-bit or 128-bit guest system is simulated on a 128-bit (or higher) host machine.

As appreciated by the person with ordinary skills in the art, the present invention may be embodied as a method, a system, and/or a computer program product. Therefore, the present invention can be embodied in the form of entire hardware, entire software, or the combination of software and hardware. Additionally, the present invention may be embodied as a computer program product contained on machine-readable media where the computer executable program instructions for programming a computer system to execute the process according to the invention are stored. The term "machine-readable media" used herein include any media that provide the computer system with instructions for execution. Such media may take various forms, including but not limited to: non-volatile media, volatile media, and transmission media. Non-volatile media commonly comprise, for example, floppy disk, floppy magnetic disk, hard disk, magnetic tape, or any other magnetic media, CD-ROM or any other optical media, slotting card or any other physical media with hole pattern, PROM, EPROM, EEPROM, flash memory, any other memory chip or cartridge, or any other media that can be read by the computer system and are appropriate for storing instructions.

Additionally, it should be appreciated that each block in the flow chart or block chart and the combination of some blocks may be implemented by some computer program instructions. These computer program instructions may be provided to a general purpose computer, a specific purpose computer, or a processor of other programmable data processing device, to produce a machine, in which these instructions, when executed by the computers or the processor of other programmable data processing device, can create the means for implementing the functions indicated by the blocks of the block chart and/or the flow chart.

Although the present invention has been presented and described specifically by reference to the preferred embodiments, it is not intended to be exhaustive or limited the invention in the form disclosed. Many modifications on forms and details will be apparent to those ordinary skills in the art without deviating from the spirit and scope of the invention. The embodiments were chosen and described in order to best explain the principles of the invention, the practical application, and to enable others of ordinary skill in the art to understand the invention for various embodiments with various modifications as are suited to the particular use contemplated.

The invention claimed is:

1. A method for speeding memory management unit (MMU) simulation with direct address mapping on a host system, the host system supporting a full-system simulator on which a guest system is simulated, the method comprising the following steps:
   setting a border in the logical space assigned for the full-system simulator by the host system, thereby dividing the logical space into a safe region and a simulator occupying region;
   shifting the full-system simulator itself from the occupied original host logical space to the simulator occupying region; and
   reserving the safe region for use with at least a part of the guest system,
   wherein the border is a specific logical address and wherein the simulator may shift its own codes and data to a logical space region higher than the border, and reserve the region lower than the border as a safe region for use with the guest system, such that a guest effective address used in the guest system which is lower than the border may be considered as a host effective address in the host system, and may be directly mapped to a host physical address by the host MMU.

2. The method according to claim 1, wherein:
   setting the border to 0xFFFFFFFF so that the safe region can hold the whole guest system when a host machine running the host system is 64-bit and the simulated guest system is 32-bit; and
   setting the border to a specific fixed value so that the safe region can hold some parts of the guest system when the host machine running the host system is 64-bit and the simulated guest system is also 64-bit, wherein it is controllable to place which parts of the guest system into the safe region.

3. The method according to claim 1, wherein the step of shifting the full-system simulator itself from the occupied host logical space to the simulator occupying region further comprising:
   if the full-system simulator cannot be shifted to the simulator occupying region, reserving the full-system simulator at its original position and shifting the safe region upwards or downwards; and
   injecting the following operation into a translation pattern of load/store instructions in the guest system: after reserving of an original guest effective address to be accessed by a future load/store instruction completes, attaching an address offset to the guest effective address, for accessing to the safe region in the shifted address space.

4. The method according to claim 1, further comprising: after setting the safe region, marking the set original safe region as an unmapped region.

5. The method according to claim 4, further comprising:
   when a load/store instruction is executed on the guest system, determining whether the guest effective address to be accessed by the load/store instruction is an unmapped address;
   if the guest effective address to be accessed by the load/store instruction is not an unmapped address, performing memory access and executing the operation of the load/store instruction; and
   if the guest effective address to be accessed by the load/store instruction is an unmapped address, filling the entry in a translation lookaside buffer (TLB) in the MMU simulated by the full-system simulator, and causing the guest effective address to be a mapped address, and performing memory access and executing the operation of the load/store instruction afterwards.

6. The method according to claim 5, wherein the step of performing memory access and executing the operation of the load/store instruction further comprising:
   if the guest effective address to be accessed by the load/store instruction locates inside the safe region, directly using the guest effective address as an identifiable host effective address in the host system, and enabling the load/store instruction to directly perform memory access to a memory in the host system; and
   if the guest effective address to be accessed by the load/store instruction locates outside the safe region, causing the MMU to perform the translation from guest effective address to guest physical address through a TLB lookup, then performing memory access to a memory in the host machine through the host effective address corresponding to the guest physical address.

7. The method according to claim 5, wherein the step of filling the entry in a TLB in the MMU simulated by the full-system simulator is progressed by triggering an exception due to the effective address to be accessed by the load/store instruction being an unmapped address.

8. The method according to claim 5, wherein the step of filling the entry in a TLB in the MMU simulated by the full-system simulator further comprising:
   performing a TLB check;
   if the TLB is not full, filling a new entry directly into the TLB;

if the TLB is full, replacing an existing entry in the TLB, and unmapping a host physical page corresponding to the existing entry; and directly mapping a logical page corresponding to the guest effective address to a host physical page.

9. The method according to claim 8, wherein, if the simulated guest system itself can guarantee that a page table entry will not be modified when it is not in the TLB, causing the TLB to hold more entries than an actual predetermined number, so that the entry is directly added into the TLB without the efforts of TLB entry replacement and physical page unmapping, wherein the size of the TLB may achieve at most that of a host TLB in the host system.

10. The method according to claim 1, further comprising the step of invalidating an entry of a TLB, said step comprising:

detecting a TLB invalidation instruction;

causing the related TLB entry to become an invalid entry; and unmapping a logical page in the memory in the host system corresponding to this entry.

11. An apparatus for speeding memory management unit (MMU) simulation with direct address mapping on a host system, the host system supporting a full-system simulator on which a guest system is simulated, the apparatus comprising:

a processor configured with means for setting a border in a logical space assigned for the full-system simulator by the host system, thereby dividing the logical space into a safe region and a simulator occupying region;

means for shifting the full-system simulator itself from an occupied original host logical space to the simulator occupying region; and means for reserving the safe region for use with at least a part of the guest system, wherein the border is a specific logical address and wherein the simulator may shift its own codes and data to a logical space region higher than the border, and reserve the region lower than the border as a safe region for use with the guest system, such that a guest effective address used in the quest system which is lower than the border may be considered as a host effective address in the host system, and may be directly mapped to a host physical address by the host MMU.

12. The apparatus according to claim 11, wherein the border setting means being further used for:

setting the border to 0xFFFFFFFF so that the safe region can hold the whole guest system when a host machine running the host system is 64-bit and the simulated guest system is 32-bit; and setting the border to a specific fixed value so that the safe region can hold some parts of the guest system when the host machine running the host system is 64-bit and the simulated guest system is also 64-bit, wherein it is controllable to place which parts of the guest system into the safe region.

13. The apparatus according to claim 11, wherein the simulator shifting means being further used for:

if the full-system simulator cannot be shifted to the simulator occupying region, reserving the full-system simulator at its original position and shifting the safe region upwards or downwards; and injecting the following operation into a translation pattern of load/store instructions in the guest system: after reserving of an original guest effective address to be accessed by a future load/store instruction completes, attaching an address offset to the guest effective address, for accessing to the safe region in the shifted address space.

14. The apparatus according to claim 11, wherein the safe region management means being further used for:

after setting the safe region, marking the set original safe region as an unmapped region.

15. The apparatus according to claim 11, further comprising:

an instruction translation module, for translating instructions executed on the guest system, and, when encountering a load/store instruction, passing the instruction to an instruction translation optimization module for translation;

an instruction translation optimization module, for, when a load/store instruction is executed, determining whether the guest effective address to be accessed by the load/store instruction is an unmapped address, and if the guest effective address is not an unmapped address, performing memory access and executing the operation of the load/store instruction; and a guest address translation lookaside buffer (TLB) management module, for, if the guest effective address to be accessed by the load/store instruction is an unmapped address, filling the entry in a TLB in the MMU simulated by the full-system simulator, and causing the guest effective address to be a mapped address.

16. The apparatus according to claim 15, wherein the instruction translation optimization module further comprises:

means for, if the guest effective address to be accessed by the load/store instruction locates inside the safe region, directly using the guest effective address as an identifiable host effective address in the host system, and enabling the load/store instruction to directly perform memory access to a memory in the host system; and means for, if the guest effective address to be accessed by the load/store instruction locates outside the safe region, causing the MMU to perform the translation from guest effective address to guest physical address through a TLB lookup, then performing memory access to a memory in the host system through the host effective address corresponding to the guest physical address.

17. The apparatus according to claim 15, wherein the address translation lookaside buffer management module filling the entry in a TLB in the MMU simulated by the full-system simulator is progressed by triggering an exception due to the effective address to be accessed by the load/store instruction being an unmapped address.

18. The apparatus according to claim 15, wherein the address translation lookaside buffer management module further comprises:

means for performing a TLB check;

means for, if the TLB is not full, filling a new entry directly into the TLB;

means for, if the TLB is full, replacing an existing entry in the TLB, and unmapping a host physical page corresponding to the existing entry; and means for directly mapping a logical page corresponding to the guest effective address to a host physical page;

wherein, the address translation lookaside buffer management module further comprises means for, if the simulated guest system itself can guarantee that a page table entry will not be modified when it is not in the TLB, causing the TLB to hold more entries than an actual predetermined number, so that the entry is directly added into the TLB without the efforts of TLB entry replacement and physical page unmapping, wherein the size of the TLB may achieve at most that of the host TLB in the host system.

19. The apparatus according to claim 11, wherein the address translation lookaside buffer management module further comprises means for invalidating an entry of the TLB, comprising:

- means for detecting a TLB invalidation instruction;
- means for causing the related TLB entry to become an invalid entry; and
- means for unmapping the logical page in the memory in the host machine corresponding to this entry.

20. A full-system simulator for speeding memory management unit (MMU) simulation with direct address mapping on a host system, comprising:

- at least one processing unit comprising:
- means for setting a border in the logical space assigned for the full-system simulator by the host system, thereby dividing the logical space into a safe region and a simulator occupying region;
- means for shifting the full-system simulator itself from the occupied original host logical space to the simulator occupying region; and
- means for reserving the safe region for use with at least a part of a guest system, wherein the border is a specific logical address and wherein the simulator may shift its own codes and data to a logical space region higher than the border, and reserve the region lower than the border as a safe region for use with the guest system, such that a guest effective address used in the guest system which is lower than the border may be considered as a host effective address in the host system, and may be directly mapped to a host physical address by the host MMU.

* * * * *